United States Patent [19]

Mizuno et al.

[11] Patent Number: 4,527,336
[45] Date of Patent: Jul. 9, 1985

[54] DISPLACEMENT MEASURING INSTRUMENT

[75] Inventors: Ichiro Mizuno; Iwao Sugizaki, both of Kawasaki, Japan

[73] Assignee: Mitutoyo Mfg. Co., Ltd., Tokyo, Japan

[21] Appl. No.: 507,833

[22] Filed: Jun. 24, 1983

[30] Foreign Application Priority Data

Jul. 2, 1982 [JP] Japan ............................. 57-115661
Jul. 2, 1982 [JP] Japan ............................. 57-115662

[51] Int. Cl.³ ............................................. G01B 3/22
[52] U.S. Cl. .................................................. 33/172 R
[58] Field of Search .............. 33/172 R, 148 R, 147 R

[56] References Cited

U.S. PATENT DOCUMENTS

| 917,097 | 4/1909 | Michelsen | 33/172 R |
|---|---|---|---|
| 1,671,912 | 5/1928 | Tillyer et al. | 33/172 R |
| 1,679,501 | 8/1928 | Scusa | 33/172 R |
| 2,771,684 | 11/1956 | Stromberg et al. | 33/172 R |
| 4,420,888 | 12/1983 | Wakao | 33/172 R |

FOREIGN PATENT DOCUMENTS

| 947964 | 1/1949 | France | 33/172 R |
|---|---|---|---|
| 430291 | 2/1948 | Italy | 33/172 R |

*Primary Examiner*—Harry N. Haroian
*Attorney, Agent, or Firm*—Flynn, Thiel, Boutell & Tanis

[57] ABSTRACT

A displacement measuring instrument wherein a cam (9) is engaged with a movable member such as a spindle (5), a rectilinear movement of the spindle (5) is converted into a rotary motion of the cam (9), the rotary motion of this cam (9) is enlarged and transmitted to a follower through a rotator (20) rotatable in synchronism with the cam (9), an indicating device (32) is driven due to rotation of the follower (21) for indicating a displacement value of the spindle (5). Component parts are small in number and construction is simplified.

9 Claims, 10 Drawing Figures

DISPLACEMENT MEASURING INSTRUMENT

BACKGROUND OF THE INVENTION

1. Field of the Invention

This invention relates to displacement measuring instruments, and more particularly to improvements in construction for imparting a displacement value of a movable member to an indicating device in a displacement measuring instrument wherein a displacement value of the movable member, one end of which abuts against a workpiece to be measured for being displaced, is indicated by the indicating device.

2. Description of the Prior Art

Heretofore, a displacement measuring instrument such as a dial gauge has been of such an arrangement that a rack is provided on a spindle as being a movable member, a rectilinear movement of the spindle is enlargedly changed into a rotary motion through an enlarging-transmitting mechanism consisting of a combination with a group of gears or sector gears engaged with this rack, the angle of rotation thus enlarged is to be indicated as a displacement value of the spindle by hands and graduations.

However, the above-described enlarging-transmitting mechanism has been disadvantageous in that a number of delicate and expensive parts such as a rack, pinion, sector gear and the like are used, the large number of component parts in all leads to difficult assembling, a high skill level is needed for adjustment, the engaged portions between the parts tend to get out of order, and further, it is difficult to eliminate the backlash. Because of this, the dial gauges and the like have had the indicating accuracy as low as 1/100 mm, and been high manufacturing cost.

SUMMARY OF THE INVENTION

The present invention has as its object the provision of a displacement measuring instrument such as a dial gauge, being high in measuring accuracy and low in manufacturing cost through the development of the enlarging-transmitting mechanism free from the above-described disadvantages, and is characterized in that a means of converting the rectilinear movement into the rotary motion by means of a cam, which has been considered unnecessary, is introduced, and there are provided a rotator integrally connected to this cam and a follower engageable therewith, to constitute an enlarging-transmitting mechanism.

More specifically, it has been found from experiments that, in the following equation, if the value $\theta$ is one degree or more, then the rectilinear movement of the spindle is converted into the rotary motion of the cam within a range having no trouble in the practical use, and, if the value of $\theta$ is two degrees, then a very smooth motion can be achieved.

$$\tan \theta = \frac{r - r_1}{2\pi r}$$

where r represents a base circle (longer diameter) and $r_1$ represents a shorter diameter disposed at a position $r_1$ turned through 360° from the position of the longer diameter.

On the other hand, in a displacement measuring instrument such as a dial gauge, it is almost impossible in the practical use to make the base circle r of a cam to be 50 mm or more in its construction. In general, 10 to 20 mm is preferable. Here, the base circle r is set at 10 mm and the value $\theta$ of $$\tan \theta = \frac{r - r_1}{2\pi r}$$

is made to be two degrees, then $r_1$ becomes 7.8 mm, whereby the stroke of the spindle is limited to about 2.2 mm.

Thus, the present invention contemplates that, in order to secure the indicating accuracy of 1/1000 mm and obtain a required stroke of the spindle, there is established an enlarging-transmitting mechanism constituted by a combination of a cam being allowed to rotate within a turn as being a simplified means free from the backlash, for converting a rectilinear movement into a rotary motion, a rotator integrally connected to the cam and rotatable in synchronism therewith as being a means for enlarging and transmitting this rotary motion and a follower engageable with the rotator, for operating an indicating device, and the present invention includes the enlarging-transmitting mechanism.

To the above end, according to the present invention, there are provided a case body, a movable member displaceably mounted on the case body and capable of abutting at one end thereof against a workpiece to be measured, a cam engageable with the movable member in the case body and rotatable due to a displacement of the movable member, a rotator rotatable in synchronism with the cam, a follower engageable with the rotator for turning and an indicating device for indicating a displacement value of the movable member due to the turning of the follower, and the displacement value of the movable member is indicated by the indicating device through the rotator and the follower.

DESCRIPTION OF THE PREFERRED EMBODIMENTS

Description will hereunder be given of the preferred embodiments of the present invention with reference to the drawings.

Figure 1:
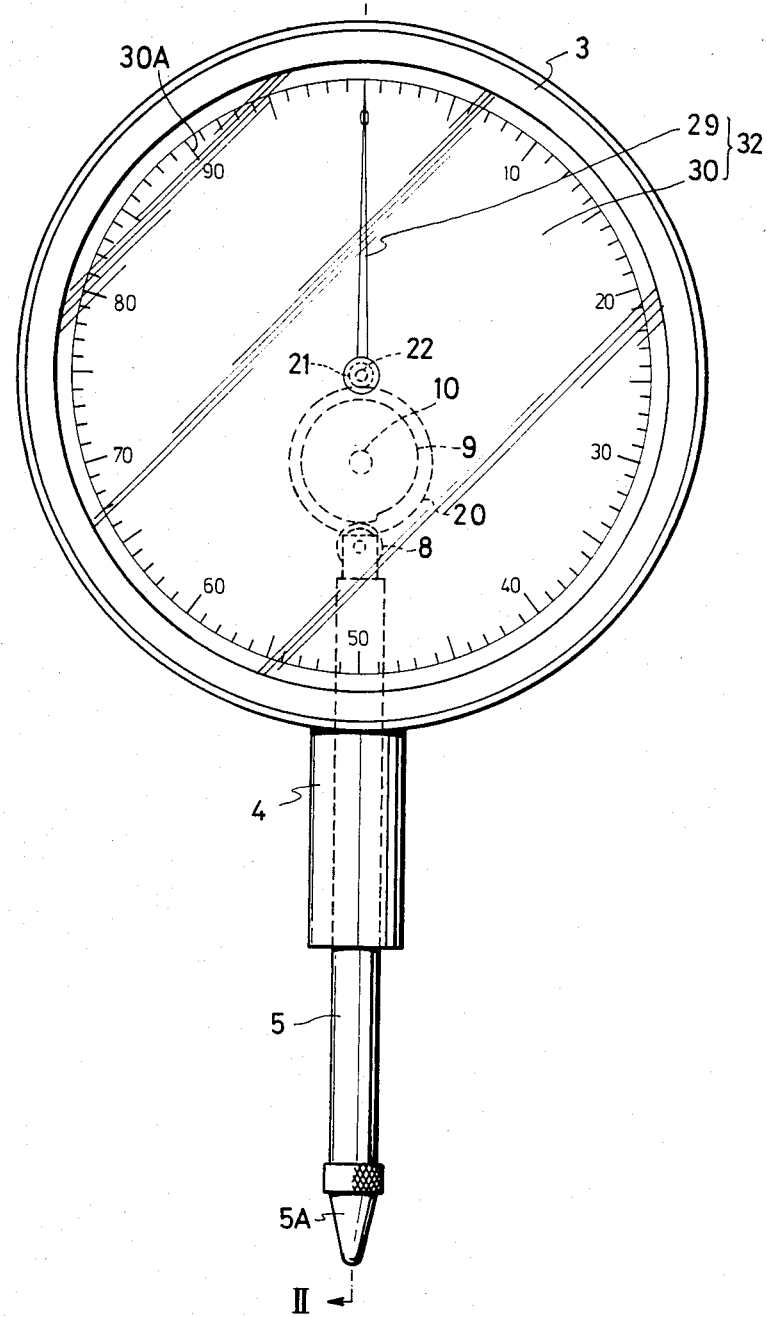
FIG. 1 is a front view showing the general arrangement of a first embodiment, in which the displacement measuring instrument according to the present invention is applied to a dial gauge.
Figure 2:
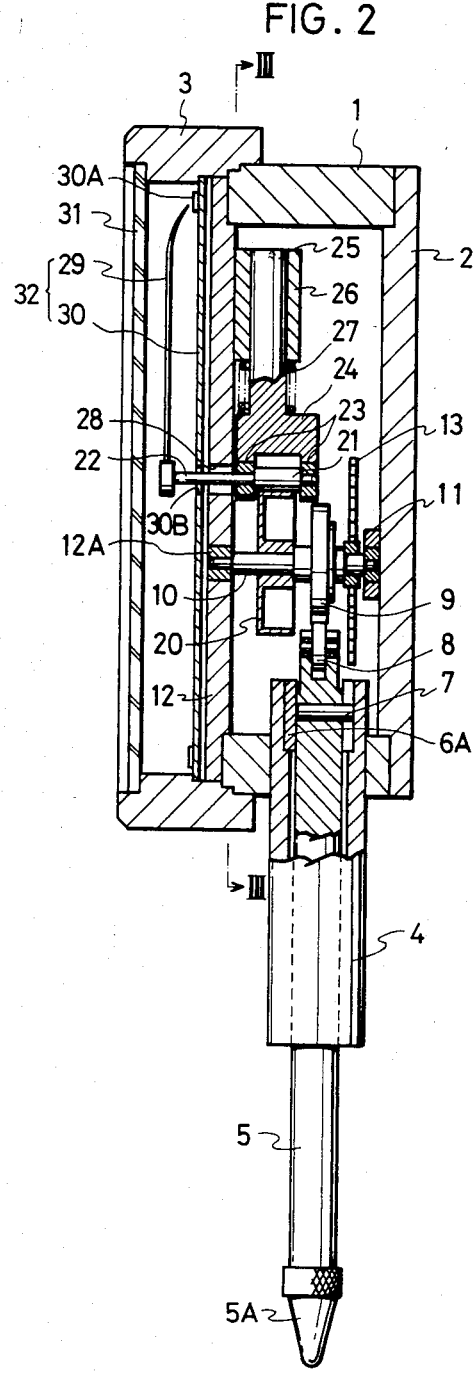
FIG. 2 is a sectional view in the direction indicated by the arrows from line II—II in FIG. 1.
Figure 3:
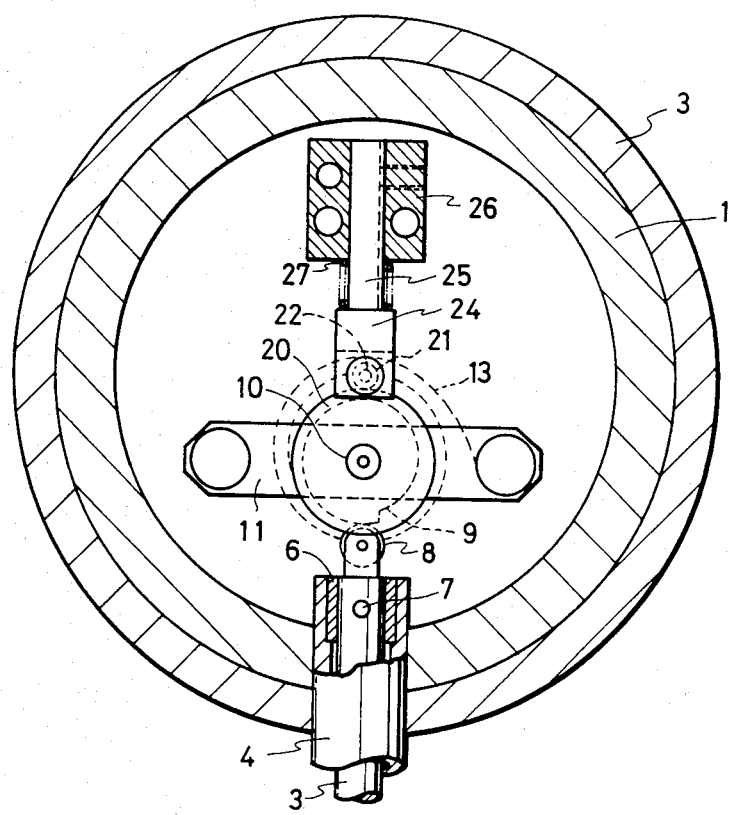
FIG. 3 is a sectional view in the direction indicated by the arrows from line III—III in FIG. 2.

FIGS. 1 and 2 show the general arrangement of one embodiment in which the displacement measuring instrument according to the present invention is applied to a dial gauge. Referring to these drawings, a disk-like rear lid 2 is secured to one side of a short cylindershaped inner frame 1, a ring-shaped outer frame 3 is coupled onto the other side of the inner frame 1, and a dial plate 30 and a transparent cover 31 are solidly secured to this outer frame 3. Here, the aforesaid inner frame 1, rear lid 2 and outer cover 3 constitute a case body.

A spindle 5 as being a movable member is axially displaceably supported at a predetermined position of the inner frame 1 through a stem 4. A contact point 5A is provided at the forward end of the spindle 5, which can come into contact with the workpiece to be measured through this contact point 5A. Furthermore, the spindle 5 is biased by a compression spring, not shown, downwardly in the drawing, and a bearing 6 formed thereon with a rotation locking groove 6A is provided in the stem 4. On the other hand, a rotation locking pin 7 radially projecting and inserted at the forward end thereof into the rotation locking groove 6A is embedded in the spindle 5, whereby this pin 7 and the groove 6A serve to lock the rotation of the spindle 5.

An abutting roller 8 is rotatably supported on the proximal end of the spindle 5, and a cam 9 can abut against this abutting roller 8. The cam 9 is provided at the outer periphery thereof with a cam surface formed into an Archimedean spiral, and, when r represents a base circle (longer diameter) and $r_1$ represents a shorter diameter disposed at a position turned through 360° from the position of the longer diameter, a value $\theta$ in the following equation is set at one degree or more, and preferably, at two degrees or more.

$$\tan\theta = \frac{r - r_1}{2\pi r}$$

For example, when r=10 mm and $r_1$=7.6 mm, $\theta$=2.18, and then, the stroke of the spindle 5 becomes 2.4 mm. This cam 9 is solidly secured to a turning shaft 10, one end of which is rotatably supported on the rear lid 2 through a bearing member 11 and the other end is also rotatably supported on a base plate 12 affixed to the inner frame 1 through a bearing 12A. Additionally, one end of a hair spring 13 is solidly secured to the turning shaft 10, and the other end of this hair spring 13 is affixed to the bearing member 11, whereby the cam 9 is biased in the counterclockwise direction in FIG. 1, so that the cam 9 and the abutting roller 8 can be in constantly abutting contact with each other.

The central portion of a rotator roller 20 as being a rotator is solidly affixed to the turning shaft 10, so that the rotator roller 20 and the cam 9 can be always turned in synchronism with each other through the turning shaft 10. Frictionally engaged with the rotator roller 20 is a follower roller 21 as being a follower. At least the outer peripheral surface of either one of these rotator roller 20 and follower roller 21 is non-slip finished by textured surface roll finish or coating finish with rubber or soft synthetic resin, so that the rotator roller 20 and the follower roller 21 can be brought into rolling contact without sliding friction. Furthermore, the follower roller 21 has a less diameter than the rotator roller 20 at a predetermined rate, whereby, when the rotator roller 20 makes a full turn, the follower roller 21 turns a plurality of times.

The follower roller 21 is integrally formed on a rotary shaft 22 at a predetermined position thereof, and the rotary shaft 22 is disposed in a manner to be rotatable along the center axis of the inner frame 1. This rotary shaft 22 is rotatably supported by a non-slip urging member 24 through bearings 23. This non-slip urging member 24 is integrally formed with a linearly movable shaft 25 extending in the radial direction of the inner frame 1. This linearly movable shaft 25 is supported by the base plate 12 through a retainer member 26, in a manner to be linearly movable in the axial direction thereof. A compression coil spring 27 is confined between the retainer member 26 and the non-slip urging member 24, so that the biasing force of this compression coil spring 27 can bring the follower roller 21 into constantly abutting contact with the rotator roller 20. In addition, the non-slip urging member 24 and the compression coil spring 27 constitute a biasing means for bringing the follower roller 21 into frictional engagement with the rotator roller 20.

One end portion of the rotary shaft 22 is extended through center holes 28 and 30B formed in the central portions of the base plate 12 and a dial plate 30, respectively, projected for a predetermined length toward a transparent cover 31, and solidly secured at the forward end portion with a dial hand 29, which can point graduations 30A attachingly provided on the surface of the dial plate 30. Here, the dial hand 29 and the graduations 30A constitute an indicating device 32.

Description will hereunder be given of action of the present embodiment.

The cam 9 is always abutted against the abutting roller 8 through the resiliency of the hair spring 13, and, when the spindle 5 is displaced in the axial direction thereof, the cam 9 is turned commensurate to the displacement value of the spindle 5. This turning is transmitted to the rotator roller 20 through the turning shaft 10. The turning of the rotator roller 20 is enlarged and transmitted to the follower roller 21 frictionally engaged with this rotator roller 20, whereby the dial hand 29 solidly secured to the rotary shaft 22 points the graduations 30A attachingly provided on the dial plate 29, so that a displacement value of the spindle 5 can be indicated by the indicating device 32.

The present embodiment described above can offer the following advantages.

Expensive parts such as a rack and pinion are not used at all, whereby the construction is simplified. The number of parts can be reduced to less than one third that of the conventional apparatus, so that the apparatus can be provided at a low manufacturing cost and assembled easily. Furthermore, the engaged portions between the pinion and the like are free from being shifted from each other or getting out of order and dispersions in measured values due to the backlash are eliminated, so that the backlash eliminating mechanism is not needed, thus enabling to simplify the construction. Since the construction is simplified and the pinion and the like are not used, so that the instrument can be strongly built. Moreover, the friction of the cam surface of the cam 9 does not affect the indicating accuracy, but, on the contrary, advantageously serves the smoothing of the change (transmitting).

Further, the dial hand 29 is not directly connected to the cam 9, the turning of the cam 9 is enlarged and transmitted to the dial hand 29 through the rotator roller 20 and the follower roller 21, and the dial hand 29 can rotate a plurality of times, so that the stroke of the spindle 5 can be made long and the measuring accuracy by the dial hand 29 can be easily improved.

Description will now be given of the embodiments other than the above. Same reference numerals are used throughout the drawings to designate same or similar parts, so that detailed description thereof will be omitted.

Figure 4:
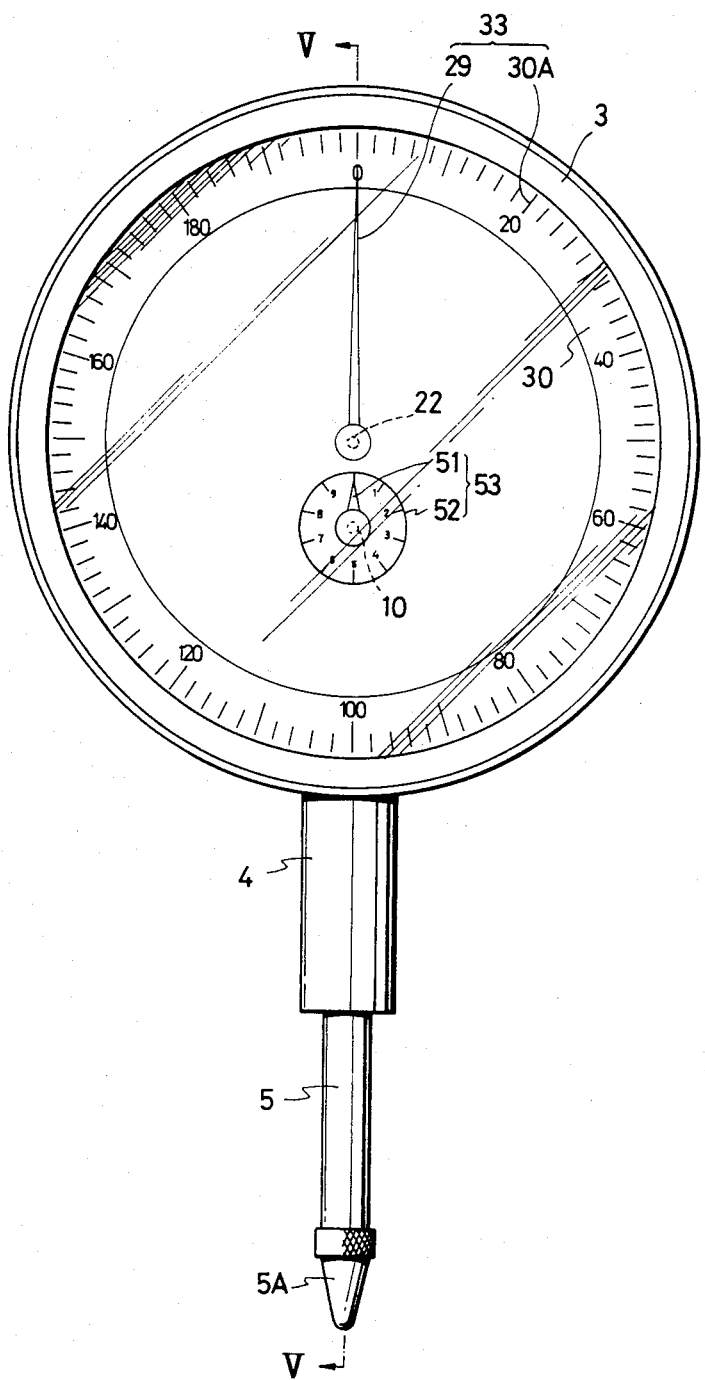
FIG. 4 is a front view showing the general arrangement of a second embodiment.
Figure 5:
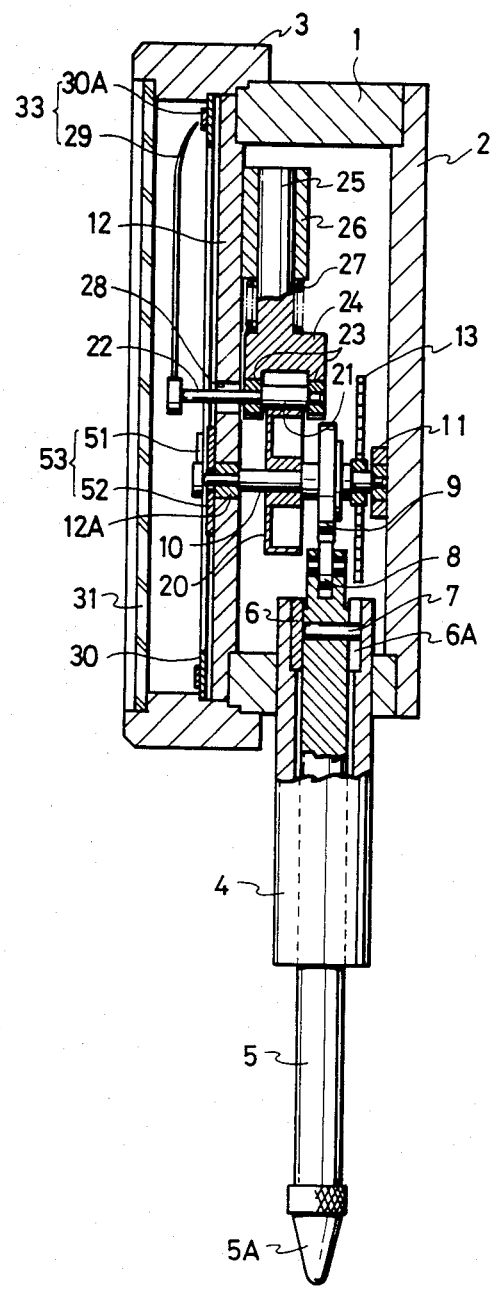
FIG. 5 is a sectional view in the direction indicated by the arrows from line V—V in FIG. 4.

FIGS. 4 and 5 show the second embodiment. Referring to the drawings, the turning shaft 10 is projected for a predetermined length toward a transparent cover 31, a counter hand 51 as being a pointer is solidly secured to the forward end of the turning shaft 10, graduations 52 to be pointed by the counter hand 51 are provided on the left side surface of the base plate 12 in the drawing, and the counter hand 51 and the graduations 52 constitute a first indicating device 53 to indicate the upper unit of an axial displacement value of the spindle 5.

Furthermore, one end portion of the rotary shaft 22 is extended through center hole 28 formed at the central portion of the base plate 12, projected for a predetermined length toward the transparent cover 31, and solidly secured at the forward end portion with the dial hand 29 as being the pointer. The dial hand 29 is adapted to point the graduations 30A provided on the surface of the dial plate 30, and, the dial hand 29 and the graduations 30A constitute a second indicating device 33 to indicate the lower unit of an axial displacement value of the spindle 5.

Description will hereunder be given of action of the second embodiment.

The cam 9 is always abutted against the abutting roller 8 through the resiliency of the hair spring 13, and, when the spindle 5 is displaced in the axial direction thereof, the cam 9 is turned commensurate to the displacement value of the spindle 5. This turning of the cam 9 is transmitted to the rotator roller 20 through the turning shaft 10, the turning of this rotator roller 20 is enlarged and transmitted to the follower roller 21 frictionally engaged with this rotator roller 20. In this case, the upper unit in the displacement of the spindle 5 is indicated by the first indicating device 53, and the lower unit is indicated by the second indicating device 33.

For example, when the stroke of the spindle 5 is 1 mm, the follower roller 21 rotates five times per a full turn of the rotator roller 20, the graduations 52 are of a uniform scale in which the circumference is divided into ten and the graduations 30A are of a uniform scale in which the circumference is divided into two hundreds, a unit of 1/10 mm is indicated as a graduation line by the first indicating device 53 and a unit of 1/1000 mm is indicated as a graduation line by the second indicating device 33.

The second embodiment described above can offer the advantages similar to those of the first embodiment, and moreover, such advantages that the reading of the measured value can be conducted very easily and quickly because the upper unit can be read by the first indicating device 53, that is, the number of rotations of the dial hand 29 is indicated by the first indicating device 53.

Figure 6:
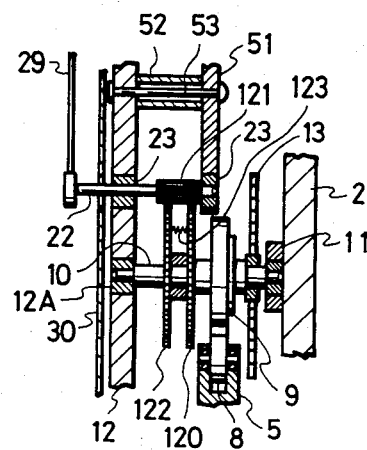
FIG. 6 is a sectional view showing the essential portions in a third embodiment.
Figure 7:
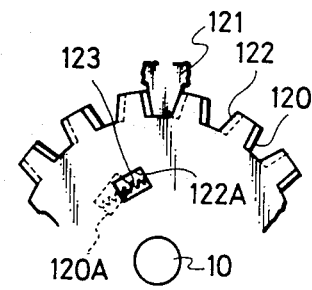
FIG. 7 is a front view enlargedly showing the engageable portions of gears in the third embodiment.

In the above-described first and second embodiments, the rotator is the rotator roller 20 and the follower is the follower roller 21, however, this arrangement may be replaced by one in which, as in the third embodiment shown in FIGS. 6 and 7, the rotator is a rotator gear 120, a follower gear 121 as being the follower is meshed with this rotator gear 120, and the turning of the cam 9 is transmitted to the dial hand 29 by these rotator gear 120 and follower gear 121. Here, the follower gear 121 is supported between the base plate 12 and a mounting plate 101, and the mounting plate 101 is solidly secured to the base plate 12 through a support 102 and a mounting screw 103.

Furthermore, in the third embodiment, a backlash eliminating gear 122 is rotatably coupled onto the turning shaft 10 at a position close to the rotator gear 120. Small windows 120A and 122A are formed in the rotator gear 120 and the backlash eliminating gear 122, respectively, a spring member 123 is stretched between the small windows 120A and 122A, and the backlash eliminating gear 122 is biased to rotate about the turning shaft 10 in a predetermined direction with respect to the rotator gear 120 through the resiliency of this spring member 123. With this arrangement, the circumferentially facing flanks of the follower gear 121 is clamped between the circumferentially facing flanks of the backlash eliminating gear 122 and the rotator gear 120, so that a backlash can be eliminated in the meshing engagement between the rotator gear 120 and the follower gear 121.

Figure 8:
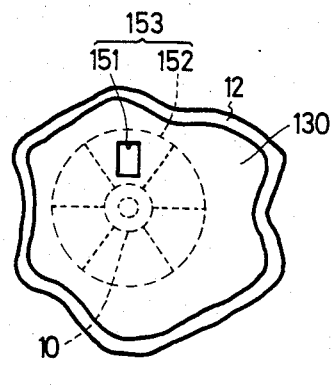
FIGS. 8 through 10 are front views showing the essential portions in fourth through sixth embodiments, respectively.

FIG. 8 shows the essential portions of the fourth embodiment, in which, onto the turning shaft 10, there is solidly secured a color identification plate 152 as being an identification marker for permitting a value of turning of the turning shaft 10 to be identified, while, in the base plate 12 and the dial plate 30, there are formed window portions 151 as being displaying portions to display the color identification plate 152. Different colors are applied on the color identification plate 152 every predetermined angular sectors in the circumferential direction, each of different colors is displayed by the window portions 151 everytime the turning shaft 12 turns through a predetermined angle, so that the value of turning of the turning shaft 12 can be identified. This color identification plate 152 is colored such that each of different colors appears everytime the dial hand 29 makes a full turn. In consequence, the window portions 151 and the color identification plate 152 constitute a first indicating device 153 to indicate the upper unit of the displacement value of the spindle 5.

Figure 9:
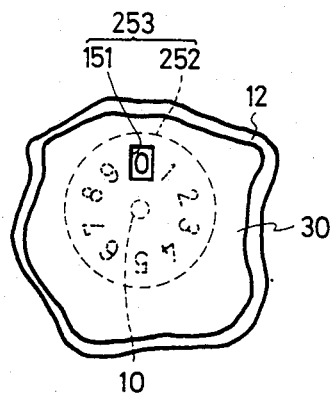

As in the fifth embodiment shown in FIG. 9, a numerical value plate 252 as being an identification marker is used in place of the color identification plate 152, and this numerical value plate 252 and the window portions 151 may constitute a first indicating device 253.

Here, the color identification plate 152 and the numerical value plate 252 may be secured to the turning shaft 10 separately of the rotator roller 20, or may be directly attached to a side surface of the rotator roller 20 on the side of the transparent cover 31.

Figure 10:
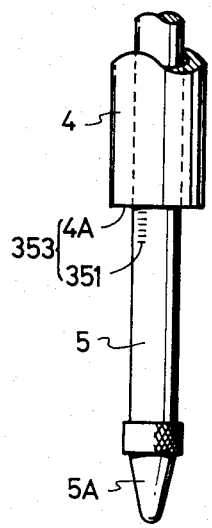

FIG. 10 shows the sixth embodiment, in which a graduated portion 351 notchingly provided in the axial direction of the spindle 5 and the bottom end face 4A of the stem 4 as being the indicating portion constitute a first indicating device 353. In addition, the indicating portion need not necessarily be limited to the bottom end face 4A, and may be a hand or the like solidly secured to the bottom end face of the stem 4 to point the aforesaid graduated portion 351 for example.

In addition, in the respective embodiments described above, description has been given of the case the displacement measuring instrument according to the present invention is applied to the dial gauge. This arrangement, however, is not exclusive and the present invention is applicable to other displacement measuring instruments such as micrometers, height gauges and calipers, or to a new displacement measuring instrument which has not ever been classified into any conventional type. Furthermore, the second indicating device 33 has been of a pointer type constituted by the dial hand 29 and the graduations 30A, however, the second indicating device need not necessarily be of the pointer type, but may be of a dial-numeral indication type or a digital indication type.

The rotator roller 20 or rotator gear 120 has been directly engaged with the follower roller 21 or follower gear 121, however, this arrangement may be replaced by the engagement through an enlarging mechanism.

The cam 9 has been formed into the Archmedean spiral. The arrangement, however, is not exclusive, any other form may be adopted. However, the Archimedean spiral enables the graduations 30A and 52 to be uniform scales, respectively.

Further, the abutting roller 8 has been secured to the spindle 5 as being the movable member. This arrangement, however, is not exclusive, and the proximal end of the spindle 5 may be directly abutted against the cam 9. However, the abutment of the spindle 5 against the cam 9 through the abutting roller 8 is advantageous in that the cam 9 can be rotated very smoothly.

In the third embodiment shown in FIGS. 6 and 7, the backlash eliminating mechanism has been constituted by the backlash eliminating gear 122 and the spring member 123. This arrangement is not exclusive, and may be replaced by one, in which one end of the hair spring is solidly secured to the rotary shaft 22 and the other end thereof is fixed to the inner frame 1, whereby the rotary shaft 22 may be constantly biased in a predetermined rotational direction, for example.

As has been described hereinabove, the present invention can provide the displacement measuring instrument simplified in construction, not using many expensive parts, and being high in measuring accuracy and low in manufacturing cost.

The embodiments of the invention in which an exclusive property or privilege is claimed are defined as follows:

1. A displacement measuring instrument, comprising:
   a case body;
   a movable member displaceably secured to said case body and capable of abutting at one end thereof against a workpiece to be measured, said movable member having a rotatably supported roller on the other end thereof;
   a rotatable shaft mounted on said case body;
   a cam supported on said shaft and rotatable therewith, said cam having an Archimedean spiral surface at the periphery thereof, against which said roller is rotatably engaged;
   a rotator secured to said shaft and being concentrically oriented with said cam;
   a rotatable follower member engageable with said rotator, said cam, said rotator and said follower member being arranged such that said follower member makes two or more revolutions per one revolution of said cam; and
   indicating means for indicating a displacement value of said movable member in response to a rotation of said follower member.

2. A displacement measuring instrument according to claim 1, wherein said rotator and said follower member are rollers frictionally engageable with each other, and wherein a biasing means is provided which biases said follower member toward said rotator and into frictional engagement with each other.

3. A displacement measuring instrument according to claim 1, wherein said indicating means comprises graduations provided on said case body and includes a dial hand fixedly secured to said rotatable shaft of said follower member.

4. A displacement measuring instrument according to claim 1, wherein said rotator and said follower member are gears which are in meshing engagement with each other, and wherein a backlash eliminating means is provided therebetween.

5. A displacement measuring instrument according to claim 4, wherein said backlash eliminating means comprises said rotator being formed into a backlash eliminating gear and being rotatably coupled to said rotatable shaft; and a spring member for biasing said backlash eliminating gear to cause said backlash eliminating gear to revolve about said rotatable shaft in a predetermined direction with respect to said rotator, and wherein circumferentially facing flanks of said follower member is clamped between circumferentially facing flanks on said backlash eliminating gear and said rotator.

6. A displacement measuring instrument according to claim 1, wherein said indicating means comprises:
   a first indicating device to indicate the upper unit of a displacement value of said movable member in response to rotations of said cam; and
   a second indicating device to indicate the lower unit of a displacement value of said movable member in response to rotations of said follower member.

7. A displacement measuring instrument according to claim 1, wherein said first indicating device comprises an indicating dial hand secured to said rotatable shaft, wherein graduations are provided and which are pointed to by said dial hand, and wherein said second indicating device comprises an indicating hand secured to a further rotatable shaft on which said follower member is supported, and wherein additional graduations are pointed to by said indicating hand.

8. A displacement measuring instrument according to claim 6, wherein said first indicating device comprises an identification marker secured to said rotatable shaft for enabling a value of rotation of said rotating shaft to be identified, and wherein displaying portions are affixed to said case body, for displaying said identification marker commensurate to a rotation value of said rotatable shaft, and wherein said second indicating device comprises a further indicating dial hand secured to said further rotatable shaft and graduations are provided to which said further indicating dial hand points.

9. A displacement measuring instrument according to claim 6, wherein said first indicating device comprises a graduated portion provided on said movable member in the axial direction thereof and a pointing portion for pointing said graduated portion, and said second indicating device comprises an indicating hand secured to a further rotatable shaft and graduations which are pointed to by said indicating hand.

* * * * *